(12) United States Patent
Handekyn et al.

(10) Patent No.: US 8,095,593 B2
(45) Date of Patent: Jan. 10, 2012

(54) METHOD FOR MANAGING ELECTRONIC INFORMATION, THE RELATED USER TERMINAL AND THE RELATED INFORMATION SOURCE

(75) Inventors: Koen Handekyn, Lochristi (BE); Michaël Frederic François Albert Brackx, Gent (BE)

(73) Assignee: Alcatel Lucent, Paris (FR)

( * ) Notice: Subject to any disclaimer, the term of this patent is extended or adjusted under 35 U.S.C. 154(b) by 865 days.

(21) Appl. No.: 11/619,247

(22) Filed: Jan. 3, 2007

(65) Prior Publication Data

US 2007/0168438 A1    Jul. 19, 2007

(30) Foreign Application Priority Data

Jan. 5, 2006 (EP) .................................... 06290039

(51) Int. Cl.
*G06F 13/00* (2006.01)

(52) U.S. Cl. ....................................... 709/204; 709/223

(58) Field of Classification Search .................... 97/206; 709/204–207, 224, 223; 715/751–759; 434/350–352

See application file for complete search history.

(56) References Cited

U.S. PATENT DOCUMENTS

| | | | |
|---|---|---|---|
| 5,978,766 A | 11/1999 | Luciw et al. | |
| 6,112,186 A * | 8/2000 | Bergh et al. | 705/10 |
| 6,965,920 B2 * | 11/2005 | Pedersen | 709/206 |
| 2002/0007400 A1 * | 1/2002 | Pedersen | 709/206 |
| 2003/0115278 A1 * | 6/2003 | Goker | 709/207 |
| 2004/0019651 A1 | 1/2004 | Andaker | |
| 2006/0059260 A1 * | 3/2006 | Kelly et al. | 709/225 |
| 2009/0030985 A1 * | 1/2009 | Yuan | 709/204 |

FOREIGN PATENT DOCUMENTS

| | | |
|---|---|---|
| EP | 0 643 359 A2 | 3/1995 |
| EP | 1 564 670 A2 | 8/2005 |
| WO | WO 99/67731 | 12/1999 |
| WO | WO 03/098932 A1 | 11/2003 |

OTHER PUBLICATIONS

U.S. Appl. No. 11/619,239, filed Jan. 3, 2007, titled Electronic Messaging Management Method and Related Devices.

* cited by examiner

*Primary Examiner* — Kenneth R Coulter
(74) *Attorney, Agent, or Firm* — Fay Sharpe LLP

(57) ABSTRACT

The present invention relates to a method for managing electronic information and related devices where electronic information is forwarded from at least one electronic information source of a plurality of electronic information sources towards at least one terminal of at least one corresponding user of a plurality of terminals of corresponding users through a communications network. The at least one electronic information source of the plurality of electronic information sources sends electronic information towards the at least one terminal of at least one corresponding user. The terminal of a first user and terminals of users related to this first user send their electronic information preferences towards a community interest management module. The community interest management module subsequently determines community information preferences based on the information preferences of the first user and based on the information preferences of the users related to the first user.

15 Claims, 2 Drawing Sheets

METHOD FOR MANAGING ELECTRONIC INFORMATION, THE RELATED USER TERMINAL AND THE RELATED INFORMATION SOURCE

The present invention relates to a method for managing electronic information, wherein the electronic information is forwarded from at least one electronic information source of a plurality of electronic information sources towards a terminal of a corresponding user of a plurality of terminals of corresponding users through a communications network a related terminal and a related electronic information source.

Such a method and related devices are generally known in the art. A first possibility of managing information electronic messages, such as advertisements sent, by an information electronic message source, such as an information source, based on a profile of users based on "purchase behavior" resulting in different sets of electronic information messages sent via email or instant messaging towards a user of a communications terminal. Alternatively, if such a user makes some subscriptions requiring indicating "interests", an electronic information message source may send electronic information such as advertisements. Alternatively a user can maintain a list of RDF Site Summary sources where a client will pull in information messages called RSS, messages, based on these indicated interests. These interests can be used to send targeted advertising to the subscribers.

Profiling a user on its purchase behavior only gives a narrow picture of the potential customer. The querying of end users for personal interest does not tell anything about the broader picture of interests that are relevant for his/her purchase behavior.

An object of the present invention is to provide an electronic information management method of the above known type and a related system but wherein the electronic information management method is better suited to the information needs of a user of such a method and related devices.

According to the invention, this object is achieved by the method for managing electronic information, the related terminal, a related community interest management module, and the related electronic information source.

In this way, by means of a terminal of a first user and terminals of users related to the first user, where the users related to the first user for instance may be buddies of the first user, sending information preferences towards a community interest management module where the community interest management module determines community information preferences for the first user based on the information preferences of the first user and the information preferences of the users related to the first user.

The community information preferences determined by the community interest management module when exchanged with at least one electronic information source of the plurality of electronic information sources enable the at least one information electronic information sources to send electronic information towards the terminal of the first user, based on the community information preferences of this first user.

In this way the electronic information sources are enabled to send information that match the preferences of the first user but also the preferences of the buddies of the first user in this way provisioning the first user with information that better suit the interest of the first user.

The preferences may for instance include keywords based on which a user may want to subscribe or may contain source addresses of a source providing interesting information or a combination thereof.

Electronic information may be any kind of electronic message such as an advertisement, an e-mail, a multimedia message, etc.

Other characteristic features of the present invention include a community interest management module, a preferences exchanging part, and an information requesting part.

The community information preference are exchanged with at least one electronic information source of the plurality of electronic information sources and the at least one electronic information source sends electronic information towards the terminal of the first user based on the community information preferences of the first user and the users related to said user.

The community interest management module exchanges the community information preference with the terminal of the first user that requests the at least one electronic information source of the plurality of electronic information sources to send electronic information towards the terminal of the first user based on said community information preferences of the first user and the users related to the first user.

This may be the case in an RSS system where the RSS clients request the RSS server to provide requested information.

The determining of the community information preferences based on the information preferences of the first user and information preferences of the users related to the first user, sent towards the community interest management module additionally may be based on at least one decision rule that determines whether or not to apply the information preferences of the first user or the information preferences of the users related to the first user, in the community information preferences.

This decision rule may be applied for weighing the preferences of the related users and based on the weight taking the preferences of these related persons into account. In other words the decision rule may indicate how individual preferences are applied in order to obtain the community preferences.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 1:
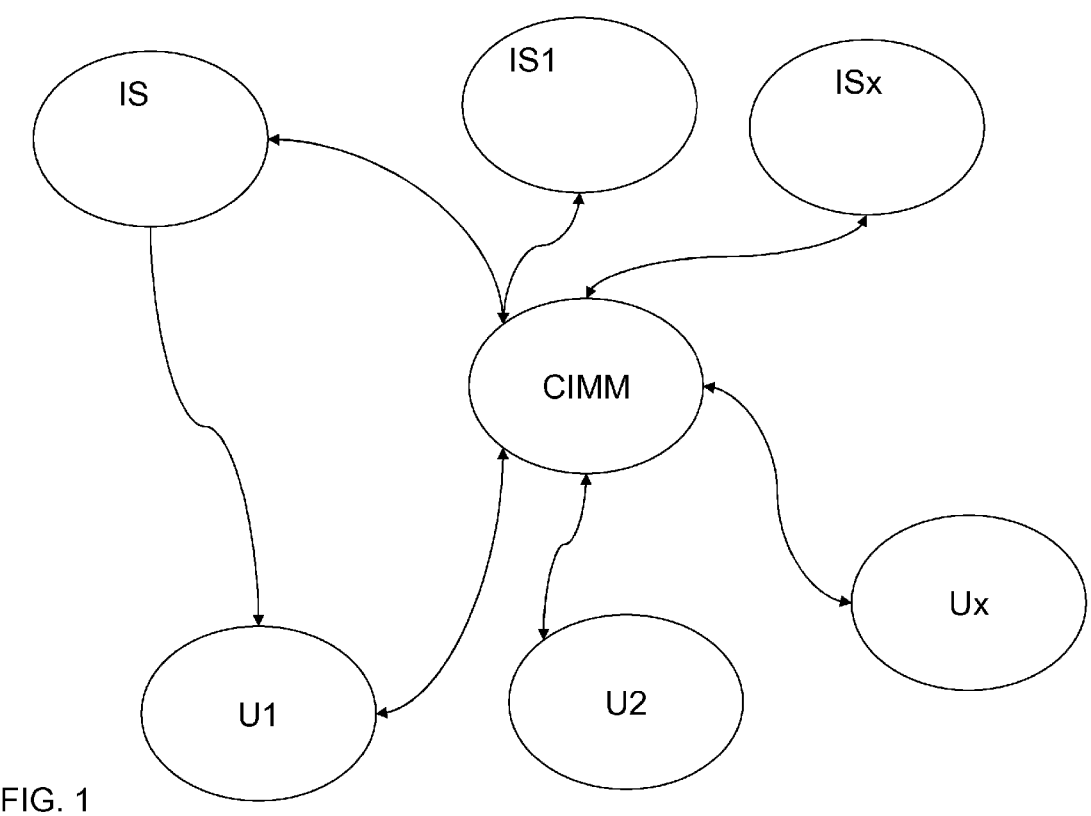
FIG. 1 represents a communications network wherein the present invention is implemented.
Figure 2:
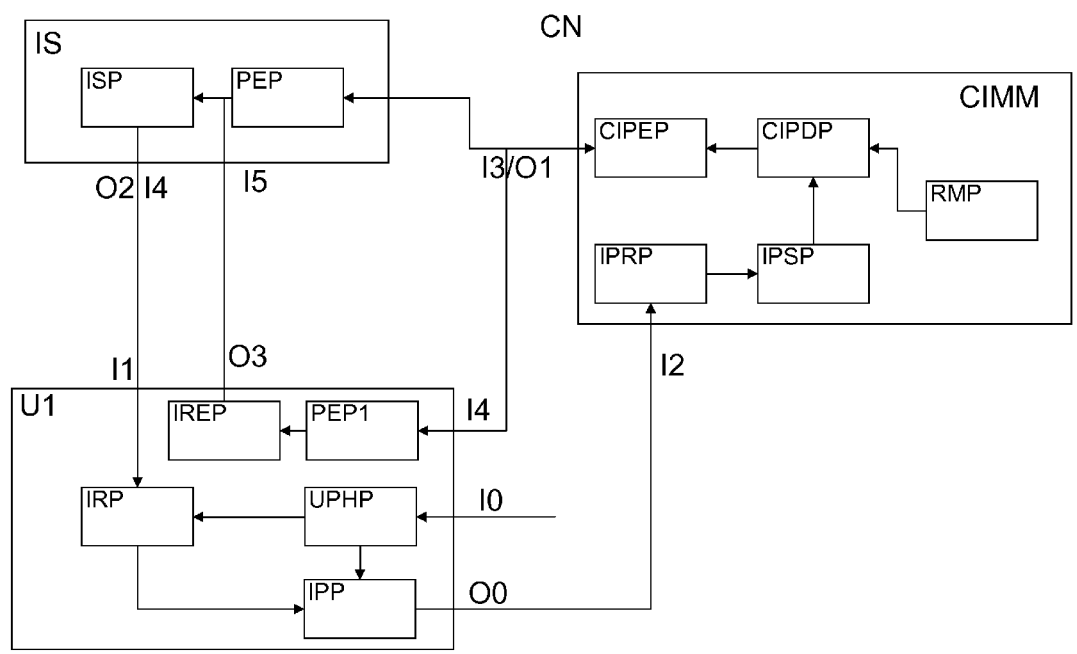
FIG. 2 represents the functional representation of each of the network elements as presented in FIG. 1.

In the following paragraphs, referring to the drawings, an implementation of the information management method in the communications network CN, the present invention will be described. In the first paragraph of this description the main elements of the communications network CN as presented in FIG. 1 are described. In the second paragraph, all connections between the before mentioned elements and described means are defined. Subsequently all relevant functional means of the mentioned communications network as presented in FIG. 2 are described followed by a description of all interconnections. In the succeeding paragraph the actual execution of the method for session establishment is described.

The essential elements of the communications network as presented in FIG. 1 are information electronic information sources IS, IS1, ISx that are able to send information with respect to a certain subject towards terminals of corresponding users, of a plurality of terminals each terminal relating to a user. The communications network CN further comprises a community interest management module CIMM that is able to determine community information preferences based on information preferences of the first user U1 and the users related to the first user.

Each of the previously mentioned devices and/or network elements are coupled over the communications network CN. The communications network CN in turn may comprise several access networks and or home networks all intercoupled via a core network such as the Internet or a private service provider. Any other suitable combination of networks may be applied as well.

The present invention alternatively may also be applied in an interactive Television network.

The Terminal U1 comprises an information reception part IRP that is able to receive information sent by at least one information source of the plurality of information sources. The terminal of the prior art may comprise a user preference holding part UPHP that is adapted to hold a user profile of the corresponding user. This user profile may comprise a list of interests of this user.

The terminal further comprises an information preference processing part IPP that is able to determine an information preference subsequently to forward the information preference towards a community interest management module CIMM.

The terminal may additionally have a preferences exchanging part PEP1 that is adapted to exchange community information preferences for the first user with a Community interest management module CIMM and an information requesting part IREP that is adapted to request the at least one electronic information source of said plurality of electronic information sources IS . . . ISx to send electronic information based on the community information preferences for the first user.

The information reception part IRP has an input-terminal that is at the same time an input-terminal I1 of the terminal U1. The information reception part IRP further is coupled with an output to an input of the information preference processing part IPP that in turn has an output-terminal that is at the same time an output-terminal O0 of the terminal U1.

The user preference holding part UPHP has an input-terminal that is at the same time an input-terminal 10 of the terminal U1 and in turn is coupled with an output to an input of the Information processing part IPP. The user preference holding part UPHP furthermore has an output that is coupled to an input-of the information reception part IRP.

The a preferences exchanging part PEP1 has an input-terminal that is at the same time an input-terminal I4 of the terminal U1. The preferences exchanging part PEP1 further is coupled with an output to an input of the an information requesting part IREP that in turn has an output that is coupled with an output-terminal O3 of terminal U1

The terminals U2 . . . Ux may have the same structure as terminal U1.

The Community interest management module CIMM comprises an information preferences reception part IPRP that is able to receive the information preferences from the terminal of the first user and information preferences of the users related to the first user and an information preferences storing part IPSP that is able to store the information preferences from the terminal of the first user and from terminals of users related to the first user. The Community interest management module CIMM may further comprise a rules managing part RMP that is adapted to keep at least one decision rule for each user of the plurality of users, a community information determination part CIPDP, that is adapted to determine community information preferences based on information preferences of the first user and information preferences of the users related to the first user. The community information determination part CIPDP further may be adapted to determine the community information preferences additionally based on at least one decision rule for each user of the plurality of users. Then the community interest management module comprises a community information preferences exchanging part CIPEP that is adapted to exchange the community information preferences with the least one information source of the plurality of information sources.

The information preferences reception part IPRP has an input-terminal that is at the same time an input-terminal 12 of the Community interest management module CIMM. The information preferences reception part IPRP is further coupled with an output to an input of the information preferences storing part IPSP that in turn is coupled with an output to an input of the community information determination part CIPDP. The community information determination part CIPDP has a further input that is coupled to an output of the rules managing part RMP. The community information determination part CIPDP further has an output that is coupled to an input of the community information preferences exchanging part CIPEP that in turn has an output-terminal that is coupled to an output-terminal O1 of the Community interest management module CIMM.

The information source IDS, comprises an information sending part ISP that is able to send information to at least one terminal of at least one corresponding user and further comprises preferences exchanging part PEP that is adapted to exchange community information preferences with a Community interest management module CIMM.

Moreover, the information sending part ISP is additionally adapted to send the information based on the community information preferences.

In an alternative solution the information sending part ISP obtains the community information preferences from the preferences exchanging part PEP1 located in the terminals U1 (Pull variant) instead of from the preferences exchanging part PEP located in the information source IDS (Push variant).

The information sending part ISP has an input/output-terminal that is at the same time an input/output-terminal I4/O2 of the Information Source IS. Furthermore the preferences exchanging part PEP has an input/output-terminal that is at the same time an input/output-terminal I3/O1 of the Information Source IS. The information sending part ISP alternatively may be coupled to the information requesting part of the terminal U1via input-terminal I5 of the information source IS and the output-terminal O3 of the terminal U1 for requesting the least one electronic information source of said plurality of electronic information sources IS to send electronic information based on the community information preferences for the first user.

The information sources IS . . . ISx have the same structure as Information Source IS.

In order to explain the working of the present invention it is supposed that the information preference processing part IPP, determines the information preferences of the corresponding user, amongst others based on a user profile as kept in the user preference holding part UPHP. The user preference holding part UPHP maintains a user profile of the corresponding user. This user profile may comprise a list of interests of this user.

Alternatively the information preferences may be based on a user input provisioning information preferences or on a combination of the user inputs together with the user profile. The information preference processing part IPP subsequently forwards an information containing subjects, interests etc of the user, towards a community interest management module CIMM. The information preferences reception part IPRP of the Community interest management module CIMM subsequently receives the information preferences from the terminal of the first user and in addition the information preferences of users related to the first user (Not shown). The information preferences storing part IPSP stores the information preferences from the terminal of the first user and from the terminals of users related to the first user. The users related to the first user may be the buddies of the first user.

The rules managing part RMP, keeps at least one decision rule for each user of the plurality of users. Such a decision rules may be that in case a certain percentage of the buddies of the first user determine that some information in relation to subjects or interests are interesting, this subject or interest must be incorporated in a community information preferences of this first users. Another decision rule may be that as soon as one of the buddies of the first user determines that some information in relation to subjects or interests are interesting, this subject or interest must be incorporated in a community information preferences of this first user.

The community information preferences determination part CIPDP determines a community information preference based on the information preferences of the first user and the information preferences of the users related to the first user (which may be the buddies of the first user) in combination with the decision rule related to the first user, which here may be incorporating a subject or interest for certain information, if 60 percent of the buddies indicate that information with this subject or interest or source are interesting for them. It is assumed that the majority of the buddies of the first user, for instance 70% of the buddies indeed indicate that subject x and/or interest y is an interesting for them. Hence the community information determination part CIPDP decides to advise information sources to send information with respect to subject x or interest y to the terminal U1 of the first user. The community information preferences exchanging part CIPEP then exchanges this community information preferences with the preferences exchanging part PEP of the information source IS and with a similar preferences exchanging part of at least one information source of the plurality of information sources IS1 . . . ISx. This exchanging may be applied by sending the community information preferences from the community interest management module CIMM towards each of the preferences exchanging parts by means of multicasting or a sequence of unicast messages. Alternatively each of the information sources may request the community interest management module CIMM to provide the information source with the community information preference of amongst others the first user. The relevant information source IS then is able to by means of the information sending part ISP to send information based on the community information preferences as exchanged.

In an alternative implementation the community information preferences exchanging part CIPEP may exchange this community information preferences with the preferences exchanging part PEPI located in the terminal U1. This exchanging may be applied by sending the community information preferences from the community interest management module CIMM towards the preferences exchanging parts PEPI of terminal U1 by means of unicast messages or alternatively the preferences exchanging part PEPI may request the community interest management module CIMM to provide the terminal U1 the community information preference of amongst others the first user.

Subsequently, the information requesting part IREP requests the electronic information sources IS . . . ISx to send electronic information based on said community information preferences for the first user.

The relevant information sources IS . . . ISx then by means of the information sending part ISP, send information based on the community information preferences as exchanged towards the requesting terminal U1.

Although this electronic message management system is described for examples like advertisements, such an electronic message management system may also be applied in an RSS system wherein the first user is provided with RSS source addresses representing the preferences of information sources wanted by that user.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for managing electronic information, said electronic information being forwarded from at least one electronic information source (IS) of a plurality of electronic information sources (IS . . . ISx) towards a terminal of a corresponding first user of a plurality of terminals of corresponding users (U1 . . . Ux) through a communications network, (CN) said method comprising the steps of:
   a. at least one electronic information source of said plurality of electronic information sources (IS . . . ISx) sending said electronic information towards said terminal of said first user;
   b. the terminal of said first user (UI) and terminals of users related to said first user (U2, Ux) sending electronic information preferences towards a community interest management module (CIMM), said users being related to said first user based on pre-defined relationships; and
   c. said community interest management module (CIMM) determining community information preferences for said first user based on said information preferences of said first user and information preferences of said users related to said first user, sent towards said community interest management module (CIMM) and based on at least one decision rule determining whether or not to apply said information preferences in said community information preferences of said first user.

2. The method for managing Electronic information according to claim 1, wherein said method further comprises the steps of:
   d. a community interest management module (CIMM) exchanging said community information preference of said first user with at least one electronic information source of said plurality of electronic information sources (IS . . . ISx); and
   e. said at least one electronic information source of said plurality of electronic information sources (IS . . . ISx) sending said electronic information towards said terminal of said first user (UI), based on said community information preferences of said first user.

3. The method for managing Electronic information according to claim 1, wherein said method further comprises the steps of:
   d. said community interest management module (CIMM) exchanging said community information preference of said first user with said terminal of said first user (UI); and
   e. said terminal of said first user (UI) requesting said at least one electronic information source of said plurality of electronic information sources (IS . . . ISx) to send electronic information towards said terminal of said first user (UI), based on said community information preferences of said first user and said users related to said first user.

4. The method of claim 1, wherein the at least one decision rule determining whether or not to apply said information preferences in said community information preferences of said first user comprises at least one of the following:
   determining whether a certain percentage of users related to said first user have a common interest; and
   automatically incorporating an interest of said first user into said community information preferences.

5. The method of claim 1, wherein the pre-defined relationships are set by said first user.

6. A terminal of a first user (UI) for use in a communications network (CN), said communications network (CN) comprising a plurality of electronic information sources (IS . . . ISx) and a plurality of terminals of users (UI . . . Ux), at least one electronic information source of said plurality of electronic information sources (IS . . . ISx) being adapted to send electronic information towards said terminal of said first user (UI), and a community interest management module (CIMM) for determining community information preferences, said terminal comprising:
   a. an information reception part (IRP), adapted to receive electronic information forwarded by said at least one electronic information source of said plurality of electronic information sources (IS . . . ISx); and
   b. an electronic information preference processing part (IPP), adapted to determine an information preference and to forward said information preference towards said community interest management module (CIMM);
   wherein the CIMM determines community information preferences for said first user based at least in part on information preferences of said users related to said first user; and
   wherein users are determined to be related to said first user based on pre-defined relationships.

7. The terminal of said first user (UI) according to claim 6, wherein said terminal of said first user further comprises:

c. a preferences exchanging part (PEP1), adapted to exchange community information preferences for said first user with a Community interest management module (CIMM); and
   d. a information requesting part (IREP), adapted to request said at least one electronic information source of said plurality of electronic information sources (IS . . . ISx) to send electronic information based on said community information preferences for said first user.

8. The terminal of claim 6, wherein the pre-defined relationships are set by said first user.

9. A Community interest management module (CIMM), for use in a communications network (CN) said communications network (CN) comprising a plurality of electronic information sources (IS . . . ISx) and a plurality of terminals of users (UI . . . Ux), at least one electronic information source of said plurality of electronic information sources (IS . . . ISx) being adapted to forward electronic information towards a terminal of a first user (UI), said Community interest management module (CIMM) comprising:
   a. an information preferences reception part (IPRP), adapted to receive information preferences from said terminal of said first user and information preferences of users related to said first user (U2, UX), said users being related to said first user based on pre-defined relationships;
   b. community information preferences determination part (CIPDP), adapted to determine community information preferences based on information preferences of said first user and information preferences of said users related to said first user (UI); and
   c. a rules managing part (RMP) adapted to keep at least one decision rule for each user of said plurality of users, wherein that said community information determination part (CIPDP) is further adapted to determine said community information preferences additionally based on said at least one decision rule for each user of said plurality of users.

10. The Community interest management module (CIMM) according to claim 9, wherein said Community interest management module (CIMM) further comprises a community information preferences exchanging part (CIPEP) adapted to exchange said community information preferences with said least one electronic information source of said plurality of electronic information sources (IS . . . ISx).

11. The Community interest management module (CIMM) according to claim 9, wherein said Community interest management module (CIMM) further comprises a community information preferences exchanging part (CIPEP), adapted to exchange said community information preferences for said first user with said terminal of said first user (U1).

12. The community interest management module (CIMM) of claim 9, wherein the at least one decision rule determines whether or not to apply said information preferences of said first user based on whether a certain percentage of users related to said first user have a common interest.

13. The community interest management module (CIMM) of claim 9, wherein the pre-defined relationships are set by said first user.

14. An Electronic information source (IS . . . 1Sx), for use in a communications network (CN), said communications network comprising a plurality of said electronic information sources (IS . . . ISx) and a plurality of terminals of users (UI . . . Ux), said Electronic information source (IS) comprising:

a. an electronic information sending part (ISP), adapted to send electronic information towards a terminal of a first user (at least one terminal of said plurality of terminals); and
b. a preferences exchanging part (PEP), adapted to exchange community information preferences for said first user with a Community interest management module (CIMM); and in that said electronic information sending part (ISP) is further adapted to send said electronic information towards said first user based on said community information preferences for said user;

wherein the CIMM determines community information preferences for said first user based at least in part on information preferences of said users related to said first user; and wherein users are determined to be related to said first user based on pre-defined relationships.

15. The electronic information source of claim 14, wherein the pre-defined relationships are set by said first user.

* * * * *